Sept. 23, 1941. E. V. MURPHREE, ET AL 2,256,622
MANUFACTURE OF HYDROCARBON PRODUCTS BY HYDROGENATION OF CARBON OXIDES
Filed May 29, 1940
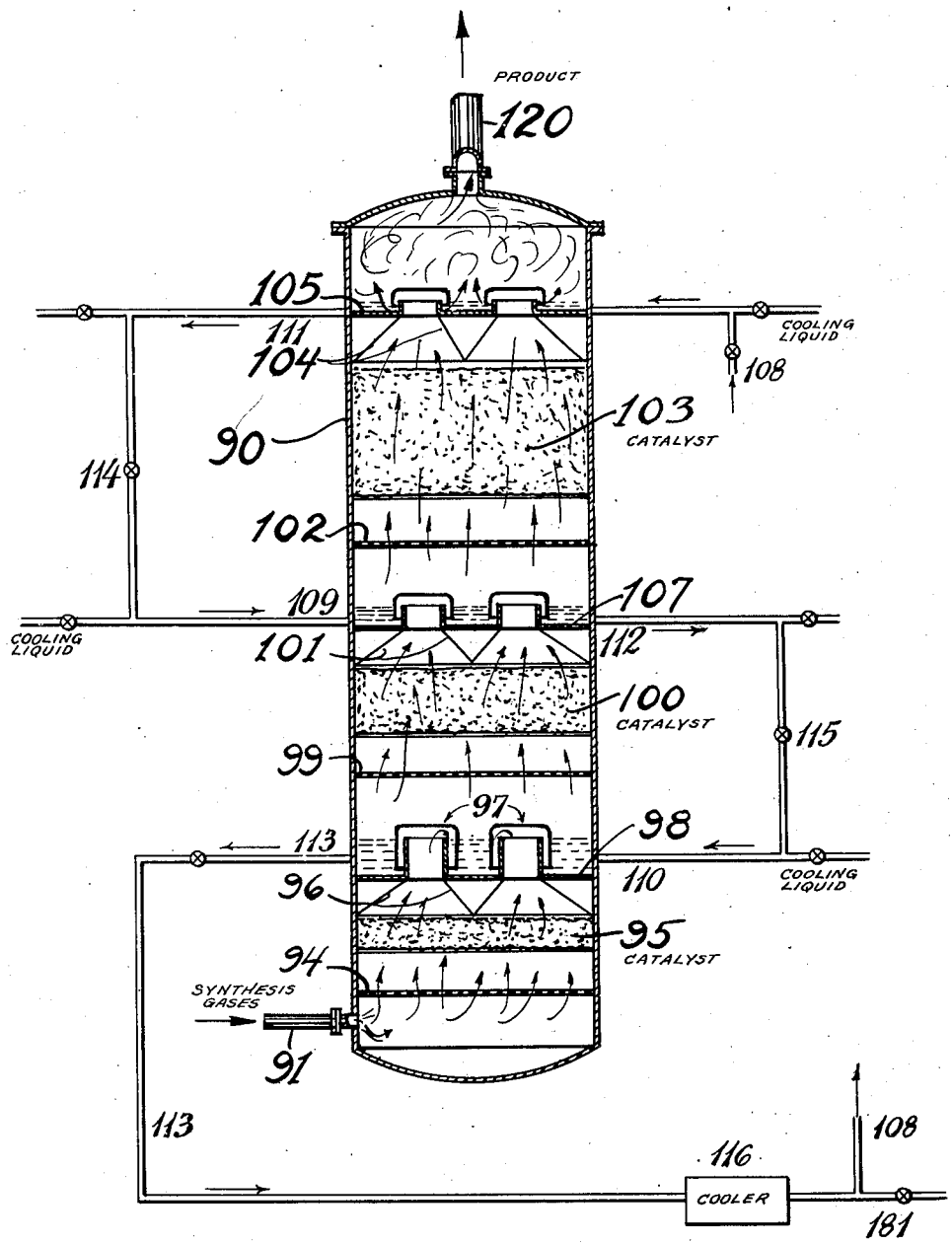
Eger V. Murphree
Edward B Peck Inventors
By P. L. Young Attorney Patented Sept. 23, 1941

2,256,622

UNITED STATES PATENT OFFICE 2,256,622

MANUFACTURE OF HYDROCARBON PRODUCTS BY HYDROGENATION OF CARBON OXIDES

Eger V. Murphree, Summit, and Edward B. Peck, Elizabeth, N. J., assignors to Standard Oil Development Company, a corporation of Delaware Application May 29, 1940, Serial No. 337,774

9 Claims. (Cl. 260—449)

The present invention is concerned with the manufacture of valuable hydrocarbon products by the hydrogenation of oxides of carbon. The invention is particularly directed to a method of controlling the temperature of the feed gases undergoing a highly exothermic catalytic reaction within a relatively narrow critical temperature range. In accordance with the present process, the gases are passed through a plurality of alternate reacting and cooling zones under conditions in which the time of contact of the gases in the reaction zones is regulated so that the temperature of the gases does not exceed a desired optimum maximum temperature and in which the time of contact of the gases in the cooling zones is controlled to lower the temperature of the gases to the desired minimum.

It is well known in the art that hydrocarbon constituents containing more than one carbon atom in the molecule and various oxygenated compounds can be obtained by reacting carbon oxides with hydrogen at elevated temperatures and pressures in the presence of a suitable catalyst. In processes of this character, due to the nature of the reaction and the amount of heat evolved, it is extremely difficult to control the rate and the course of the reaction in a manner to secure high yields of the desired product. For example, in the manufacture of hydrocarbon constituents suitable for use as motor fuels from oxides of carbon and hydrogen, it is essential that the temperature of the reacting gases be maintained within a relatively narrow critical temperature range in order to prevent various side reactions which materially decrease the yields of the desired products.

We have now discovered a method of controlling the temperature of the reacting gases throughout the reaction period which may be readily understood by reference to the attached drawing illustrating a modification of the same. For purposes of illustration our invention is described in conjunction with an operation for the manufacture of valuable hydrocarbon constituents suitable for use as motor fuels and the like.

It is assumed that the synthesis gases comprise oxides of carbon and hydrogen which may be secured from any suitable source.

The synthesis gases are introduced into synthesis chamber 90 by means of line 91. It is to be understood that recycled gases may be introduced into zone 90 along with the fresh synthesis gases. These gases flow upwardly through synthesis chamber 90, and initially pass through distributing means 94, which for the purposes of description is taken to be a pierced plate having a plurality of openings of a suitable diameter. The gases pass through a catalyst reaction zone 95 packed with a suitable catalyst and under conditions adapted to prevent the temperature of the gases exceeding an optimum desired maximum. The gases pass through catalytic reaction zone 95, are collected by collecting means 96 and pass upwardly and around bell caps 97 through a liquid maintained on the top surface of bell cap plate 98. The cooled gases after passing through cooling liquid maintained on the top of bell cap plate 98 pass through distributing means 99 and again contact catalyst in catalyst contacting zone 100. In a similar manner, the gases pass upwardly, are collected by collecting means 101, passed through a liquid cooling medium maintained on bell cap plate 107, then passed through distributing means 102, and contact catalyst in zone 103. The final reaction products are collected by collecting means 104 and cooled by passing the same through a liquid maintained on the top of bell cap plate 105, and withdrawn from synthesis chamber 90 by means of line 120. The cooling liquid may be introduced on to plates 105, 107, and 98 by means of lines 108, 109, and 110 respectively and withdrawn, if desired, by means of lines 111, 112, and 113 respectively. However, in general, it is preferred to countercurrently flow the cooling liquid from one bell cap plate to another by means of lines 114 and 115. The liquid withdrawn from plate 98 by means of line 113 may be passed through cooler 116 and recycled to the tower by means of line 108.

The reaction products are withdrawn from synthesis chamber 90 by means of line 120.

The invention may be adapted to the control of the temperature within any particularly desirable temperature range. In general the reaction is conducted in the general temperature range of from about 360° F. to 410° F. In general the temperature should not vary from the predetermined operating temperature by more than 10° F. and preferably should be controlled so that the temperature variance does not exceed 5° F. A particularly desirable method of securing this control is illustrated in the drawing in which the synthesis gases are introduced into synthesis chamber 90 by means of line 91. These gases, as described, flow upwardly through distributing means 94, 99, 102, catalyst zones 95, 100 and 103, collecting means 96, 101 and 104, and liquid cooling means maintained on the top of bubble cap plates 98, 107, 105, and are withdrawn from the chamber by means of line 120. It is to be noted that the time of contact in the respective catalyst zones increases in the direction of flow of the feed gases, while the time of contact in the respective cooling zones decreases in the direction of flow of the feed gases. Operating in this manner the control of the temperature variance from the optimum predetermined operating temperature is readily attained.

The cooling fluid may be any suitable relatively high boiling stable liquid having a relatively low vapor pressure at the operating temperature, as for example esters of phenolic sulfates of the metal or metalloid halide type, examples of which are $SbCl_3$, $SbCl_5$, $SbF_5$, $AsF_5$, $BCl_3$, $BF_3$. These halides may be used either alone or preferably dissolved in solvents such as chlorinated naphthalene, chlorinated diphenyl, trichlorotoluene, tricresyl phosphate, and the like. Other high boiling cooling mediums which are suitable are for example, cresylic acids, alkylated aromatic hydrocarbons such as propylated phenanthrene, high boiling highly cyclic fractions of petroleum oils, dibenzyl phthalate, butyl benzyl phthalate, ethyl benzyl malonate, methyl glycol phthalate, n-amyl phthalate, mixed esters of phthalic and glycollic acids, alkylated phenols, aromatic ethers such as dibenzyl ether, diphenol oxide, or hexyl phenol ether, halogenated aromatics such as toluene trichloride, chlorinated naphthalene, chlorinated diphenyl, or other aromatic esters such as n-butyl phthalate, benzyl butyrate, benzyl benzoate, voltolized aromatic organic compounds, ethyl salicylate, creosote carbonate, cresyl-laurate, naphthoyl benzoic benzoyl or cyclohexyl esters, triphenyl phosphate, tricresyl phosphate, and the like.

However, the preferred cooling medium is the synthesized product itself, particularly the relatively higher boiling fraction. One means of employing the preferred modification is to segregate the relatively higher boiling fraction, cool the same, and then to introduce the cooled relatively higher boiling fraction into synthesis chamber 90 as described. The cooling medium comprising the relatively higher boiling synthesized product withdrawn from the synthesis chamber 90 by means of line 181 may be reintroduced into the absorption recovery unit 140, as shown.

What we claim as new and desire to protect by Letters Patent is as follows:

1. In a process for the manufacture of hydrocarbons containing more than one carbon atom in the molecule from oxides of carbon and hydrogen, the method of controlling the reaction temperature which comprises passing a synthesis gas mixture comprising oxides of carbon and hydrogen under synthesizing conditions through a plurality of alternate catalyst reacting and cooling zones, passing a suitable cooling liquid through the respective cooling zones, and contacting the gases with said cooling liquid to maintain the temperature of the same within a predetermined temperature range.

2. Process in accordance with claim 1 in which the cooling liquid is passed from one cooling zone to the next succeeding cooling zone in a direction counter-current to the flow of synthesis gases.

3. Process in accordance with claim 1 in which said cooling liquid comprises an appreciable quantity of the synthesized hydrocarbon product.

4. Process in accordance with claim 1 in which said cooling liquid comprises an appreciable quantity of a relatively higher boiling fraction of the synthesized product.

5. A method of maintaining the temperature of exothermic catalytic gas reactions within closely regulated limits, which comprises passing the gases through a plurality of alternate reacting and cooling zones, controlling the maximum temperature of the gases attained in said reaction zones by regulating the time of contact, and lowering the temperature of the gases in said cooling zones to the desired minimum by regulating the time of contact.

6. A process according to claim 5, wherein the reaction gases are carbon monoxide and hydrogen and the conditions are maintained to produce higher boiling liquid hydrocarbons therefrom.

7. A process according to claim 5, wherein the gases pass upwardly through alternate reaction and cooling zones.

8. In a process for the manufacture of hydrocarbons containing more than one carbon atom in the molecule from oxides of carbon and hydrogen, the method of controlling the reaction temperature which comprises passing a synthesis gas mixture comprising oxides of carbon and hydrogen under synthesizing conditions through a plurality of alternate catalyst reacting and cooling zones, passing a suitable cooling liquid through the respective cooling zones, and contacting the gases with said cooling liquid to maintain the temperature of the gases within a predetermined temperature range, controlling the operation to increase the time of contact in the respective catalyst reaction zones in the direction of flow of the feed gases, and to decrease the time of contact in the respective cooling zones in the direction of flow of the feed gases.

9. Process in accordance with claim 8 in which the cooling liquid flows from zone to zone in a counter-currently relationship with respect to the synthesis gases.

EGER V. MURPHREE.
EDWARD B. PECK.